(12) United States Patent
Kim et al.

(10) Patent No.: US 10,704,710 B2
(45) Date of Patent: Jul. 7, 2020

(54) EASY LOCK P-CLAMP

(71) Applicant: THE BOEING COMPANY, Chicago, IL (US)

(72) Inventors: Jin Heung Kim, Mukilteo, WA (US); Jin-Seog Seo, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/196,532

(22) Filed: Nov. 20, 2018

(65) Prior Publication Data

US 2020/0158263 A1 May 21, 2020

(51) Int. Cl.
*F16L 3/00* (2006.01)
*F16L 3/10* (2006.01)
*H02G 3/32* (2006.01)

(52) U.S. Cl.
CPC .............. *F16L 3/1075* (2013.01); *H02G 3/32* (2013.01)

(58) Field of Classification Search
CPC .................................. F16L 3/233; F16L 3/137
USPC ........................ 248/65, 74.1, 74.2, 74.3, 74.4
See application file for complete search history.

(56) References Cited

U.S. PATENT DOCUMENTS

| | | | |
|---|---|---|---|
| 5,344,112 A * | 9/1994 | Peterson | ............... B60H 1/3229 24/279 |
| 5,593,125 A | 1/1997 | Storz et al. | |
| 7,685,683 B2 | 3/2010 | Coles et al. | |
| 8,590,846 B2 * | 11/2013 | Guthke | .................... H02G 3/30 174/74 R |
| 10,001,226 B2 * | 6/2018 | Haynes | ................. F16L 3/1058 |
| 10,119,631 B2 * | 11/2018 | Toll | ........................ F16L 3/1075 |
| 2009/0140106 A1 | 6/2009 | Johnson et al. | |
| 2009/0230627 A1 | 9/2009 | King, Jr. et al. | |

(Continued)

FOREIGN PATENT DOCUMENTS

| | | |
|---|---|---|
| CN | 101344190 B | 6/2010 |
| DE | 20306224 U1 | 6/2003 |

(Continued)

OTHER PUBLICATIONS

Hellermann Tyton, www.hellermanntyton.us/resources.aspx, "Ratchet P-Clamp", 2 pages, 2017.

(Continued)

*Primary Examiner* — Steven M Marsh
(74) *Attorney, Agent, or Firm* — Marshall, Gerstein & Borun LLP

(57) ABSTRACT

A clamp assembly for securing wire bundles to a structure having a body and a strap hinged to the body having an axis of rotation. The body has a ramp with a surface and has a latch wall portion. The strap has a locking wall portion wherein a radial distance from the surface to the axis of rotation decreases as the surface extends in a direction away from the strap such that with the strap in contact with the surface and slid along in contact with the surface, the strap resiliently bends in a direction toward the a first end of the strap. With the strap moved beyond the surface, the strap resiliently bends in a direction away from the first end of the strap, placing the locking wall portion in abutting relationship with the latch wall portion and positioning the strap and the body in a closed locked position.

20 Claims, 9 Drawing Sheets

(56) References Cited

U.S. PATENT DOCUMENTS

| | | | |
|---|---|---|---|
| 2012/0132761 A1* | 5/2012 | Elsmore | F16L 3/1075 |
| | | | 248/74.1 |
| 2013/0001373 A1* | 1/2013 | Ogawa | F16L 3/1041 |
| | | | 248/65 |
| 2014/0091182 A1 | 4/2014 | Fukumoto | |
| 2014/0103172 A1* | 4/2014 | Tazioli | F16L 3/1066 |
| | | | 248/74.4 |
| 2014/0151514 A1* | 6/2014 | Asai | B60R 16/0215 |
| | | | 248/74.1 |
| 2015/0053477 A1 | 2/2015 | Smith | |
| 2017/0146154 A1 | 5/2017 | Tally et al. | |

FOREIGN PATENT DOCUMENTS

| | | |
|---|---|---|
| EP | 2398122 A2 | 12/2011 |
| EP | 2813713 A1 | 12/2014 |
| EP | 3517814 A1 | 7/2019 |
| FR | 2936037 A1 | 3/2010 |
| JP | H11287360 A | 10/1999 |
| WO | WO-2011018605 A1 | 2/2011 |

OTHER PUBLICATIONS

QA Worldwide, www.cableclamp.com, 2015, 16 pgs.
Amphenol PCD Advertisement, High Performance P-Clamps, 1 pg.
Extended European Search Report for EP Application No. 19209671.7 dated Apr. 15, 2020.

* cited by examiner

EASY LOCK P-CLAMP

FIELD

This disclosure relates to a clamp assembly and more particularly to a clamp assembly which secures wire bundles to a structure.

BACKGROUND

Clamp assemblies are used to capture bundles of wires for the purpose of securing bundles of wires to a structure and routing the bundles of wires with respect to the structure. The structure can be associated with the fabrication of assembly, which requires transmission of communication and/or control signals to different locations within the assembly. Such transmission of communication and/or control signals are required for example in the operation of an aircraft and therefore the securement and routing of bundles of wires is essential in the fabrication of the aircraft. Securement and routing of bundles of wires in assembling an aircraft can be time consuming and costly.

During the fabrication process of an assembly, such as aircraft, there is a need for the installer to secure and route bundles of wires through various confinements within the aircraft and to do so in a time efficient and ergonomically beneficial manner. For example, to be able to open and close clamp assemblies by hand, can provide the installer a savings in time and cost in not having to use a tool to accomplish the opening and closing the clamp assembly during fabrication. With being able to open and close a clamp assembly by hand, an installer can also have additional ergonomic choices in which to accomplish that task. Trying to utilizing a tool within a confined space, can limit the ergonomic choices for the installer. In addition, with eliminating a need for the use of a tool to open and close the clamp assembly during fabrication, less labor time will be required which will result in cost savings for the fabrication of the aircraft.

In addition, there is consistent need to provide a reliable securement between a strap and a body of the clamp assembly for confinement of bundled wires with the bundled wires in operation. In addition, there is a need to provide additional radial reinforcement and lateral reinforcement with respect to the strap and the body of the clamp assembly so as to prevent relative radial and/or lateral movement between the strap and the body in capturing a wire bundle and with locking the clamp assembly. The reinforcement in a radial direction with respect to the captured bundled wires and reinforcement in a lateral direction, in a direction in which the bundled wires extend, assist in maintaining a desired opening shape between the strap and the body of the clamp assembly. Maintaining the desired shape between the strap and the body facilitate the installation of the wire bundles to comply with wiring standards and regulations for wiring within, for example, an aircraft structure. The maintenance of shape of the opening between the strap and the body of the clamp assemblies with captured bundled wires positioned within the clamp assembly, provides for optimization in meeting wiring requirements and thereby reduces occurrences and costs associated with reworking of wire bundle installations.

SUMMARY

An example includes a clamp assembly for securing wire bundles to a structure which includes a body which includes a first end portion and a second end portion having a ramp assembly having a surface and having a latch wall portion. The clamp assembly further includes a strap which includes a first end portion wherein the first end portion of the strap is pivotally coupled to the first end portion of the body to form a hinge with an axis of rotation about which the body and the strap rotate relative to one another. The strap further includes a second end portion having a locking wall portion. A radial distance from the surface to the axis of rotation decreases as the surface extends in a direction away from the second end portion of the strap such that with the second end portion of the strap in contact with the surface and slid along in contact with the surface, the second end portion of the strap resiliently bends in a direction toward the first end portion. With the second end portion moved beyond the surface, second end portion of the strap resiliently bends in a direction away from the first end portion placing the locking wall portion of the second end portion in abutting relationship with the latch wall portion of the second end portion of the body and positioning the strap and the body in a closed locked position.

An example includes a clamp assembly for securing wire bundles to a structure which includes a body which includes a first end portion and a second end portion of the body defines a slot. The clamp assembly includes a strap which includes a first end of a first end portion of the strap which is pivotally coupled to the first end portion of the body to form a hinge with an axis of rotation about which a second end of the first end portion of the strap and the second end portion of the body can be moved relative to one another between an open position and a closed locked position. The second end of the first end portion of the strap defines a projection. In the closed locked position the first end portion of the strap and the body define a central axis which extends between the first end portion of the strap and the body and the projection is positioned within the slot. The slot is defined by a first wall portion of the second end portion of the body and is positioned at a first radial distance from the axis of rotation and is defined by a second wall portion of the second end portion of the body positioned at a second radial distance from the axis of rotation. The first radial distance is greater than the second radial distance.

An example includes a clamp assembly for securing wire bundles to a structure which includes a body which includes a first end portion and a second end portion of the body defines a tab. The clamp assembly further includes a strap which includes a first end of a first end portion wherein the first end portion of the body is pivotally coupled to the first end of the first end portion of the strap to form a hinge with an axis of rotation about which a second end portion of the strap and the second end portion of the body can be moved relative to one another between an open position and a closed locked position. A second end of the first end portion of the strap defines a slot defined by a first wall portion of the second end of the first end portion of the strap and a second wall portion of the second end of the first end portion of the strap spaced apart from one another. In the closed locked position the first end portion of the strap and the body define a central axis which extends between the first end portion of the strap and the body with the tab positioned within the slot. The first wall portion and the second wall portion are spaced apart from one another in a direction transverse to a radial direction extending from the central axis.

The features, functions, and advantages that have been discussed can be achieved independently in various embodi-

DESCRIPTION

Figure 1:
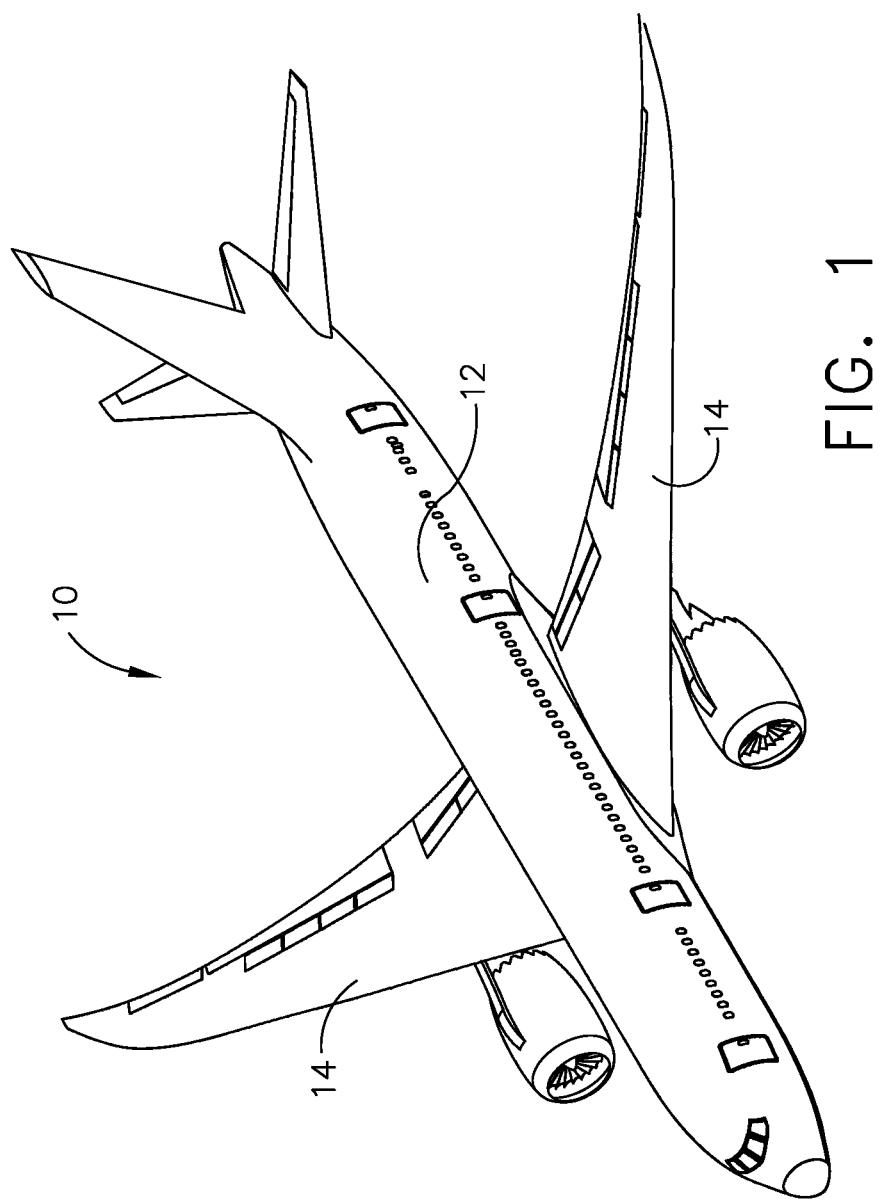
FIG. 1 is a perspective view of an aircraft.
Figure 2:
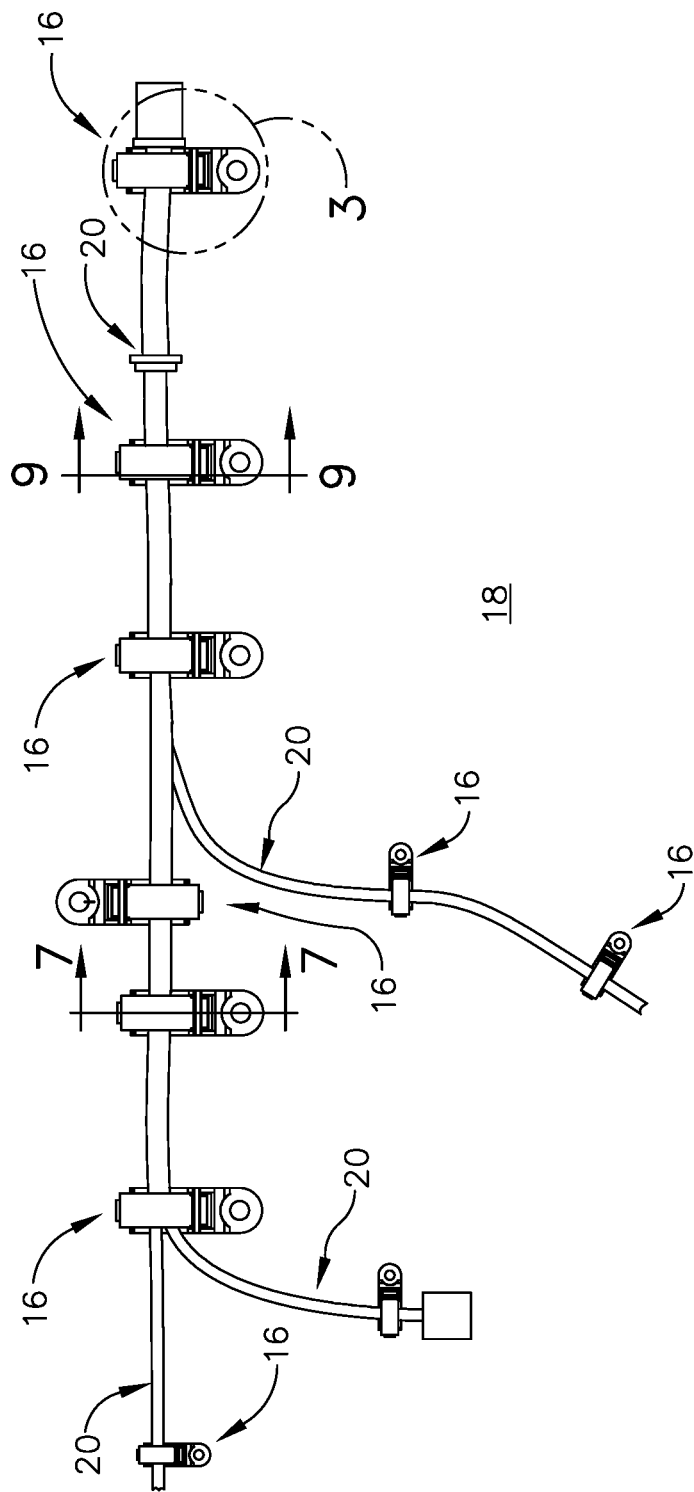
FIG. 2 is a top plan view of clamp assemblies securing bundled wires to a structure and routing the bundled wires within the aircraft of FIG. 1.
Figure 3:
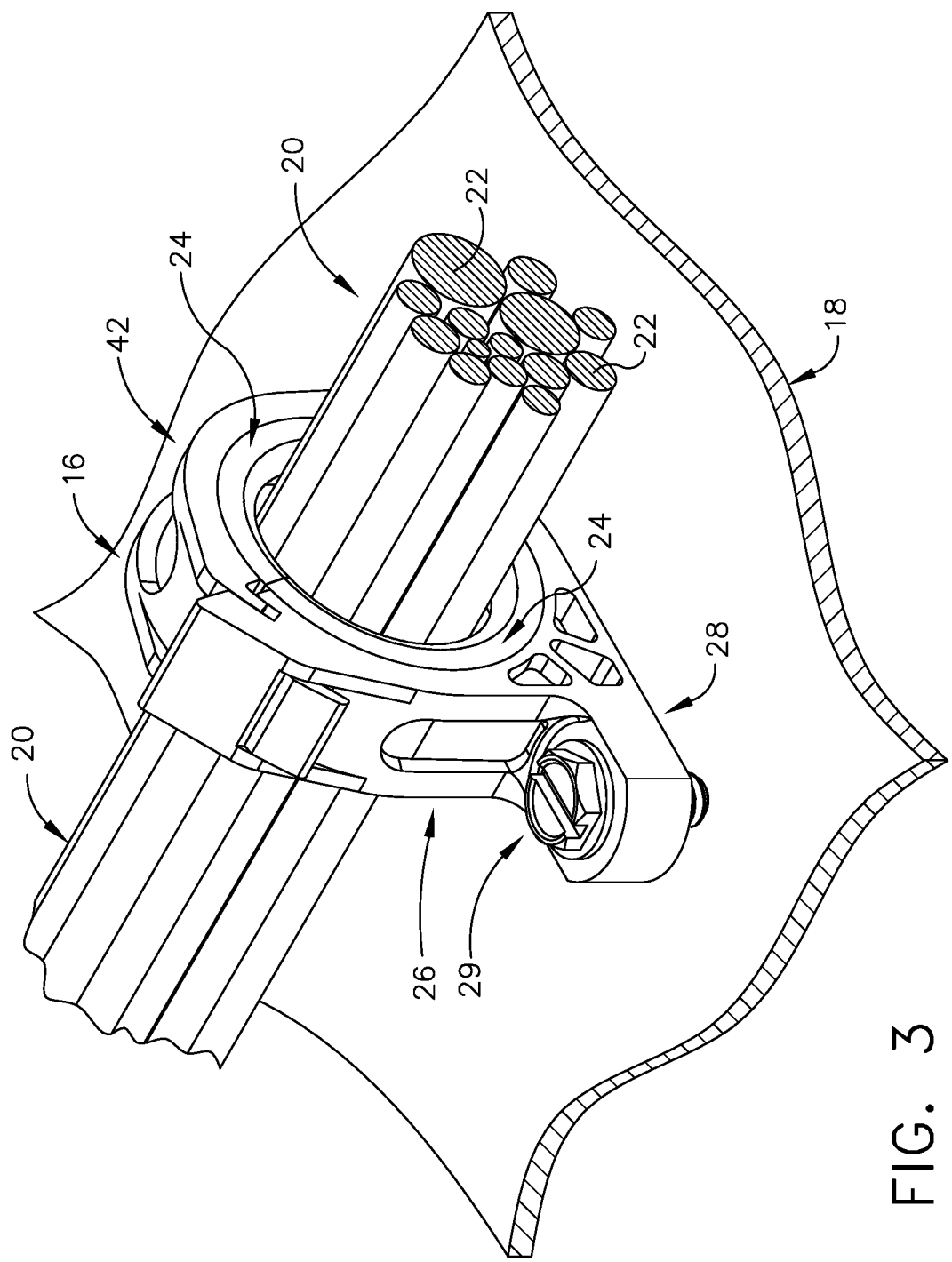
FIG. 3 is an enlarged partial perspective view of a clamp assembly securing bundled wires to the structure which is encircled and designated as 3 of FIG. 2.

In referring to FIG. 1, aircraft 10 is shown as an example of a fabricated assembly which installs wiring during fabrication. Aircraft 10 utilizes the installation of wire bundles secured within aircraft 10 and routed to various locations within aircraft 10. Wiring bundles extend throughout many portions of aircraft 10, which require transmission of communications and/or control signals, such as for example, within fuselage 12 and wings 14. Clamp assemblies 16, as seen in FIGS. 2 and 3, are secured to structure 18 positioned within aircraft 10 and facilitate routing of wire bundles 20 throughout aircraft 10 as needed. Clamp assemblies 16 secure wire bundles 20 to structure 18 wherein the number and size of wires 22 captured by clamp assembly 16 can vary depending on the need for wiring for a particular location within aircraft 10. As a result, a scaled down version of clamp assembly 16 is employed with a smaller wire bundle 20 and a scaled up version of clamp assembly 16 is employed with a larger wire bundle 20.

It is desired to make a firm securement of wire bundles 20 to structure 18 so as to maintain wires 22 in a desired position within aircraft 10 and yet not have an overly tight securement of wire bundle 20 such that unnecessary wear or damage can be imparted to wires 22 within wire bundles 20. Making this proper accommodation of wire bundle 20 within clamp assembly is achieved with properly scaling the size of clamp assembly 16 for a particular wire bundle 20 dimension and in some instances providing a cushion such as cushion collar assembly 24 as seen in FIG. 3 which will surround wires 22 within clamp assembly 16. Cushion collar assembly 24 can provide a more snug fit for wire bundles 20 which may have a slightly smaller size dimension when positioned within clamp assembly 16 maintaining wires 22 in a desired position. Cushion collar assembly 24 can also provide a protective cushioned fit to wire bundles 20 that may have a slightly larger size dimension when positioned within clamp assembly 16.

Figure 4:
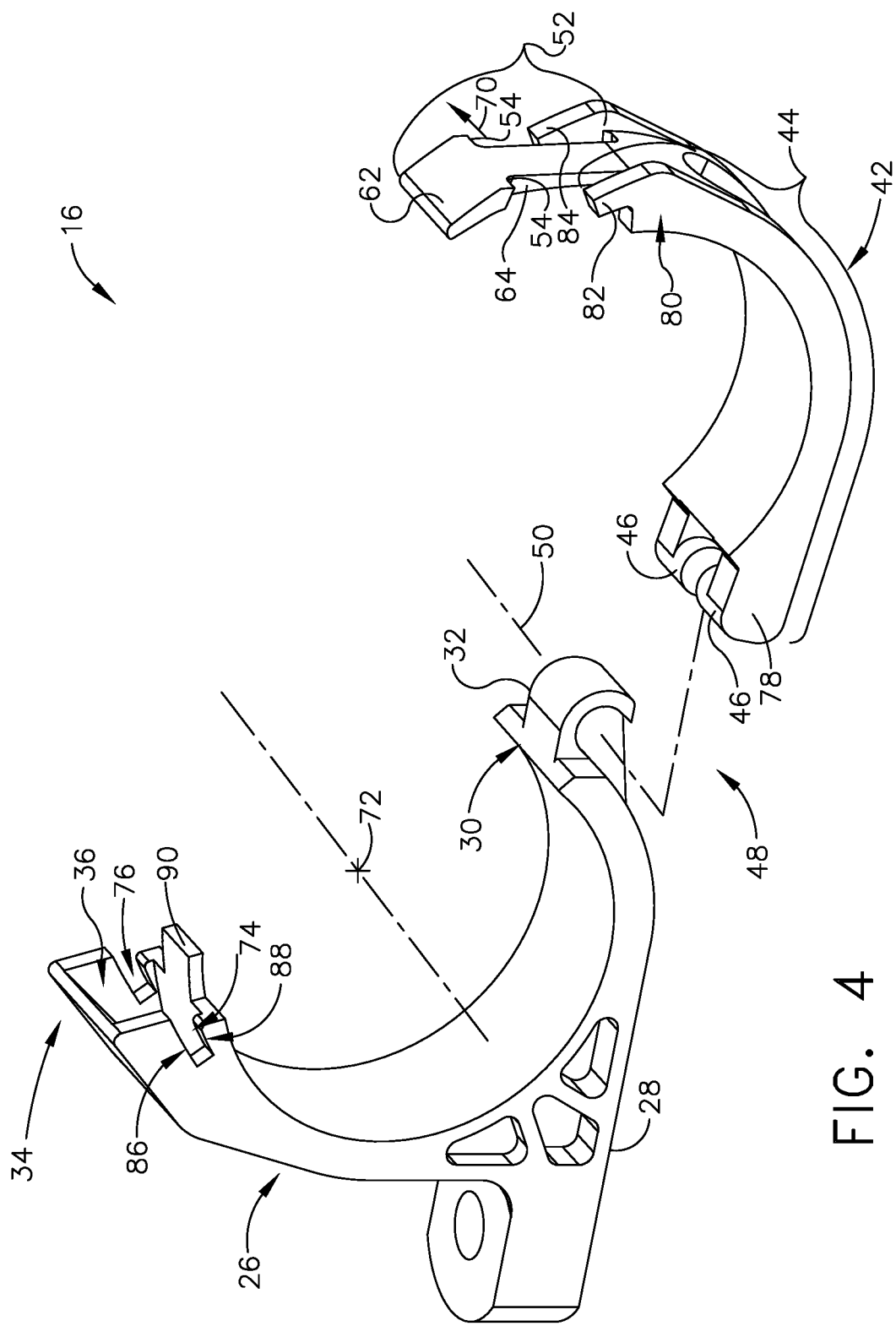
FIG. 4 is an exploded perspective view of the clamp assembly of FIG. 3 without the bundled wires or being secured to the structure.
Figure 6:
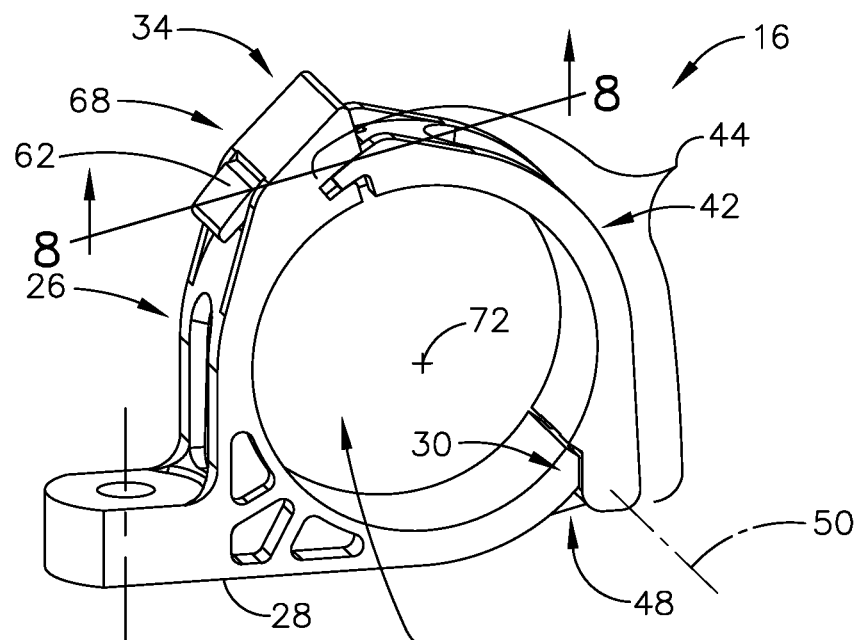
FIG. 6 is the clamp assembly of FIG. 5 secured in a closed and locked position.
Figure 5:
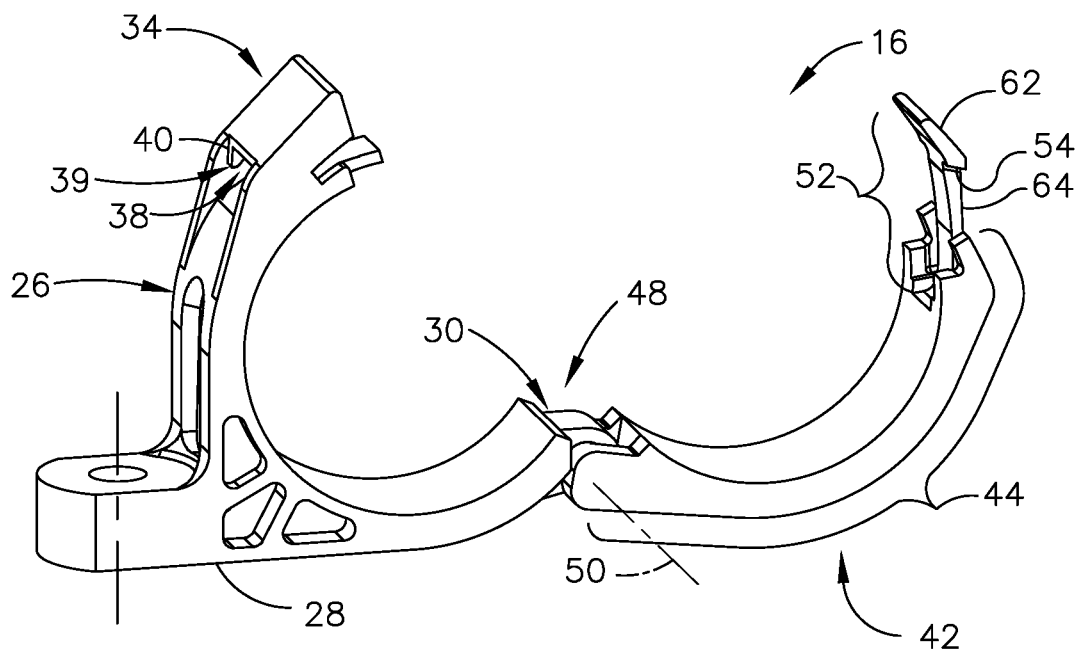
FIG. 5 is perspective side elevation view of clamp assembly of FIG. 4 assembled.

In referring to FIGS. 4-6, clamp assembly 16 for securing wire bundles 20 to structure 18 within aircraft 10 is shown. Clamp assembly 16 is constructed from one of a wide range of materials nonconductive thermoplastic polymer for example such as polyetheretherketone, polyaryletherketone, polyphenylene, amorphous thermoplastic polyetherimide, heat stabilized Nylon or other suitable materials. Clamp assembly 16 includes body 26 which includes first side 28 for positioning body 26 onto structure 18 for securement of clamp assembly 16 to structure 18, as seen in FIGS. 2 and 3. Securement can be accomplished utilizing one of a wide variety of fasteners. In this example bolt 29 is employed to secure clamp assembly to structure 18.

Figure 7A:
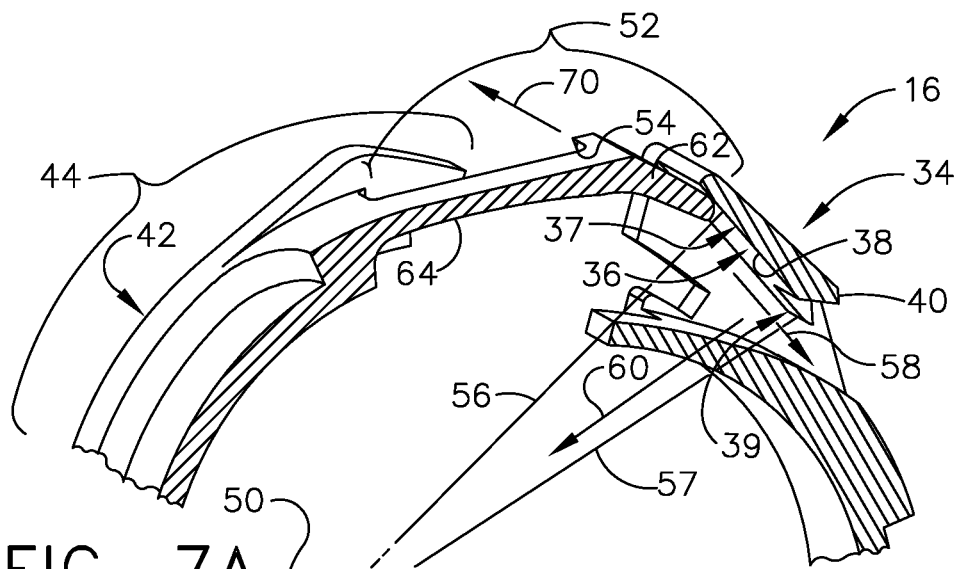
FIG. 7A-7C is a partial perspective cross section view along line of symmetry 7-7 of a clamp assembly as seen in FIG. 2 in which the clamp assembly in FIG. 7A is in an open position, in FIG. 7B the clamp assembly is being moved toward a closed locked position and FIG. 7C the clamp assembly is positioned in the closed locked position.
Figure 7B:
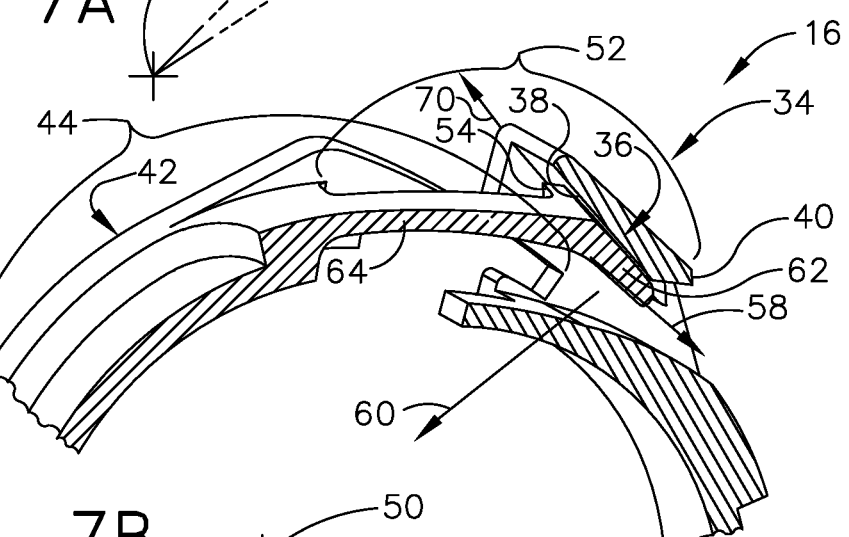
Figure 7C:
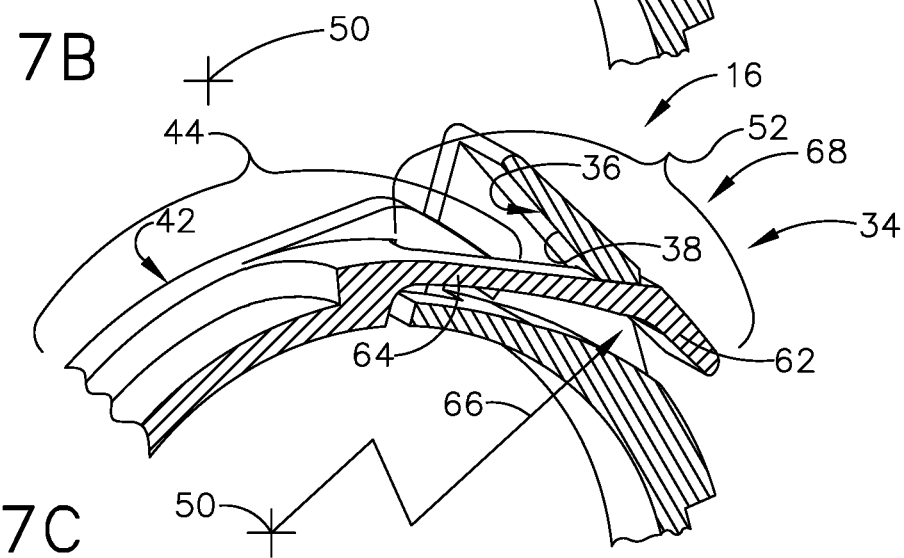
Figure 8:
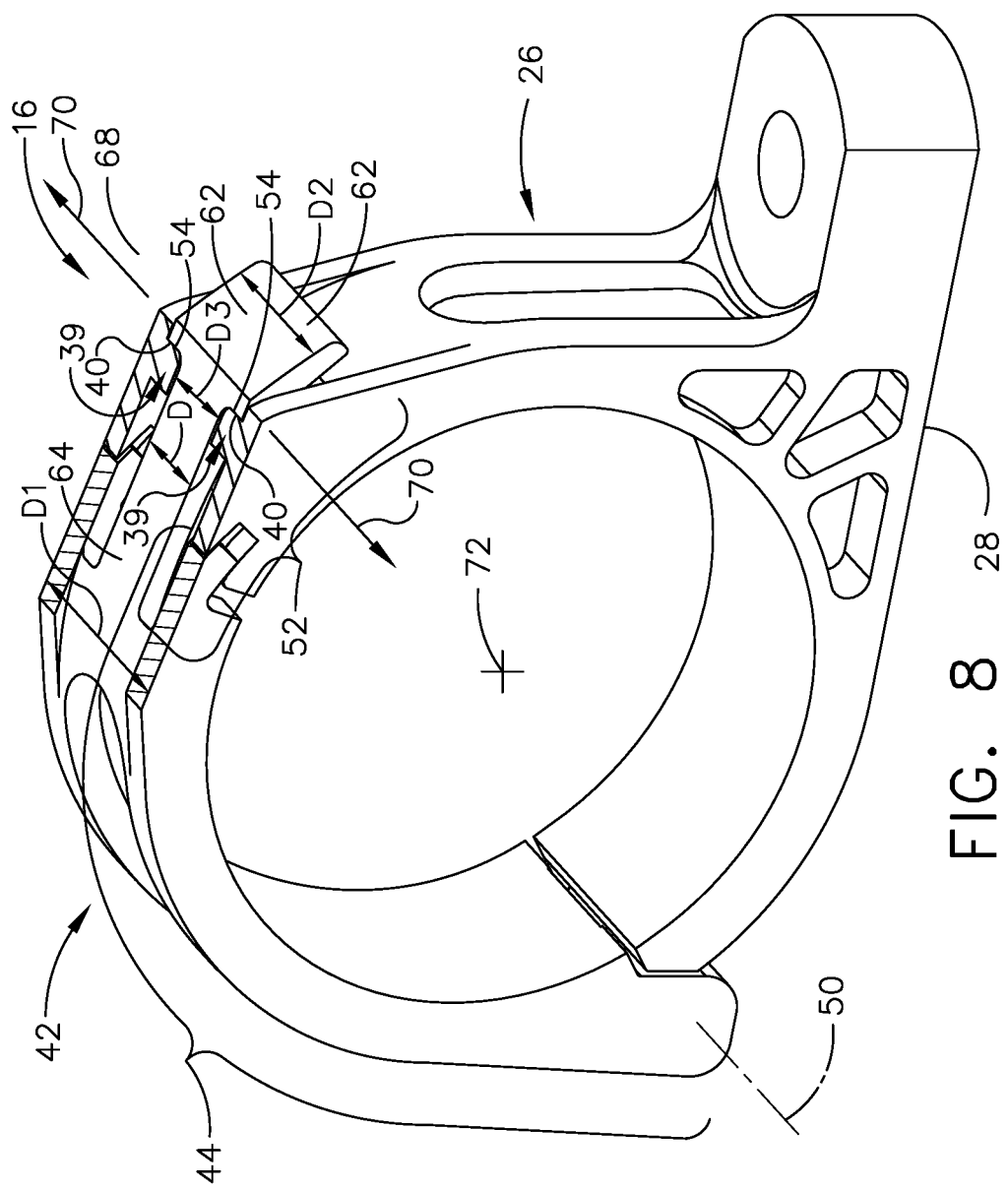
FIG. 8 is a perspective view of a cross section along line 8-8 of the clamp assembly in FIG. 6.
Figure 9:
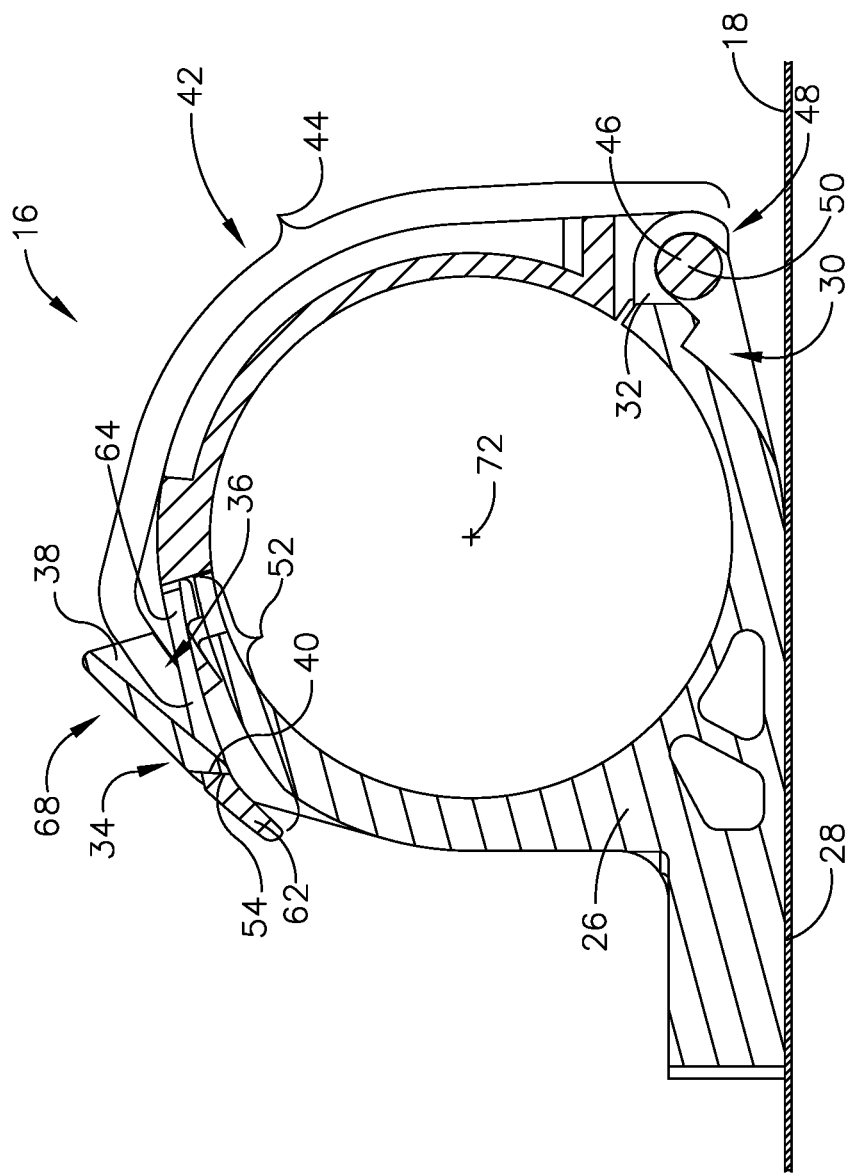
FIG. 9 is a cross section view along line 9-9 of the clamp assembly in FIG. 2 in a closed locked position without the wire bundle.

Clamp assembly 16 includes, as mentioned above, body 26 which includes first end portion 30 and second end portion 34 of body 26 has ramp assembly 36, as seen in FIGS. 7A-7C having surface 38. In addition, ramp assembly 36 has latch wall portion 40, as seen in FIGS. 7A, 7B and 8. Clamp assembly 16 further includes strap 42 which includes first end portion 44 wherein first end portion 44 of the strap is pivotally coupled to first end portion 30 of body 26 to form hinge 48 with an axis of rotation 50 about which body 26 and strap 42 rotate relative to one another. In this example, first end portion 30 of body 26, as seen in FIG. 4, has hinge flange 32 and first end portion 44 of strap 42 has hinge pin 46, wherein hinge pin 46 is shown having a two component spaced apart hinge pin 46. This arrangement of body 26 and strap 42 having hinge 48 engagement provides the installer ease in moving clamp assembly 16 between open and closed locked positions for positioning wire bundle 20 within clamp assembly 16 and capturing wire bundle 20 within clamp assembly 16 with moving strap 42 and body 26 relative to one another into a closed locked position, which will be discussed in further detail, securing wire bundle 20 within clamp assembly 16, with clamp assembly 16, in this example, secured to structure 18.

Strap 42, of clamp assembly 16, further includes second end portion 52 having locking wall portion 54 as seen in FIGS. 4, 5 and 8. Locking wall portion 54 is defined by head 62, of second end portion 52 which will be discussed herein in more detail, and is positioned on opposing sides of leg member 64 and extends in direction 70 away from leg member 64. Radial distance 56, as seen in FIG. 7A, from surface 38 of ramp assembly 36 to axis of rotation 50 decreases as surface 38 extends in direction 58 away from second end portion 52 of strap 42 to a lesser radial distance 57 than that of radial distance 56. As a result of surface 38 configuration decreasing in distance from axis of rotation 50 as surface 38 extends in direction 58, second end portion 52 of strap 42 in contact with surface 38 is slid along in contact with the surface 38, as seen in FIGS. 7A and 7B, which results in second end portion 52 of strap resiliently bending in direction 60 toward first end portion 44.

Second end portion 52, in this example, includes head 62 and leg member 64 wherein head 62 is connected to first end portion 44 of strap 42 with leg member 64. With second end portion 52 moved beyond surface 38, which in this example, includes moving head 62, as seen in FIG. 7C, beyond surface 38, which includes beyond surface 38 which extends along tab extension 39, as seen in FIG. 5, which extend from main section 37, as seen in FIG. 7A, of ramp assembly 36. Two spaced apart tab extensions 39 of ramp assembly 36, as seen in FIG. 8, are, as mentioned above, spaced apart from each other and both include surface 38 extending along each tab extension 39 upon which head 62 slides. Once head 62 slides beyond and loses contact with surface 38 of both tab extensions 39 of ramp assembly 36, surface 38 no longer provides resistance to resiliently bent second end portion 52 and leg member 64 along with head 62 bends back in direction 66 away from first end portion 44 of strap 42, as seen in FIG. 7C, placing locking wall portion 54, defined by head 62, as seen in FIGS. 4 and 8, of second end portion 52, in abutting relationship with the latch wall portion 40, as seen in FIGS. 5 and 8, positioned on tab extensions 39 of ramp assembly 36 of second end portion 34 of body 26. With locking wall portion 54 and latch wall portion 40 in abutting position, strap 42 and body 26 are positioned in closed locked position 68, as seen in FIGS. 6 and 8-10. With leg member 64 and head 62 flexing back in direction 66 and locking wall portion 54 and latch wall portion 40 are in abutting position, first end portion 44 and second end portion 52 are in tension which further secures the closed locked position 68 with locking wall portion 54 with a tension force component from locking wall portion 54 pushing against latch wall portion 40. In addition, with strap 42 and body 26 in closed locked position 68, strap 42 and body 26 define central axis 72, as seen in FIGS. 4, 6, 8-10, which extends between strap 42 and body 26.

This placing of locking wall portion 54 in abutting relationship with latch wall portion 40 is facilitated with dimension relationships of leg member 64, head 62 and first end portion 44 of strap 42. Leg member 64 has a width dimension D less than width dimension D1 of first end portion 44 of strap 42 which provides leg member 64 greater flexibility relative to first end portion 44 of strap 42 to facilitate resiliently bending of leg member 64 as head 62 travels along surface 38 of ramp assembly 36 and resiliently bending in an opposite direction when head 62 travels beyond surface 38 of tab extensions 39 of ramp assembly 36 permitting locking wall portion 54 and latch wall portion 40 to be positioned into abutting relationship. Width dimension D of leg member 64 is also less than width dimension D2 of head 62 such that with head 62 traveling beyond surface 38 of spaced apart tab extensions 39, head 62 is permitted to move locking wall portion 54 into abutting relationship with latch wall portion 40 with leg member 64 having width dimension D less than distance D3 between tab extensions 39 as seen in FIG. 8. This configuration provides for easy locking for the installer of clamp assembly 16 with the simple bending of leg member 64 and head 62 of second end portion 52 of strap 42 without the use of a tool. Once clamp assembly 16 has been engaged into the closed locked position 68 clamp assembly 16 is reliably captures and secures wire bundle 20. Should the installer need to open clamp assembly 16, the installer simply slides by hand locking wall portion 54 out of abutting relationship with latch wall portion 40 allowing installer to simply slide second end portion 52 of strap 42 away from second end portion 34 of body 26 opening clamp assembly 16 without the need for use of a tool.

Figure 10:
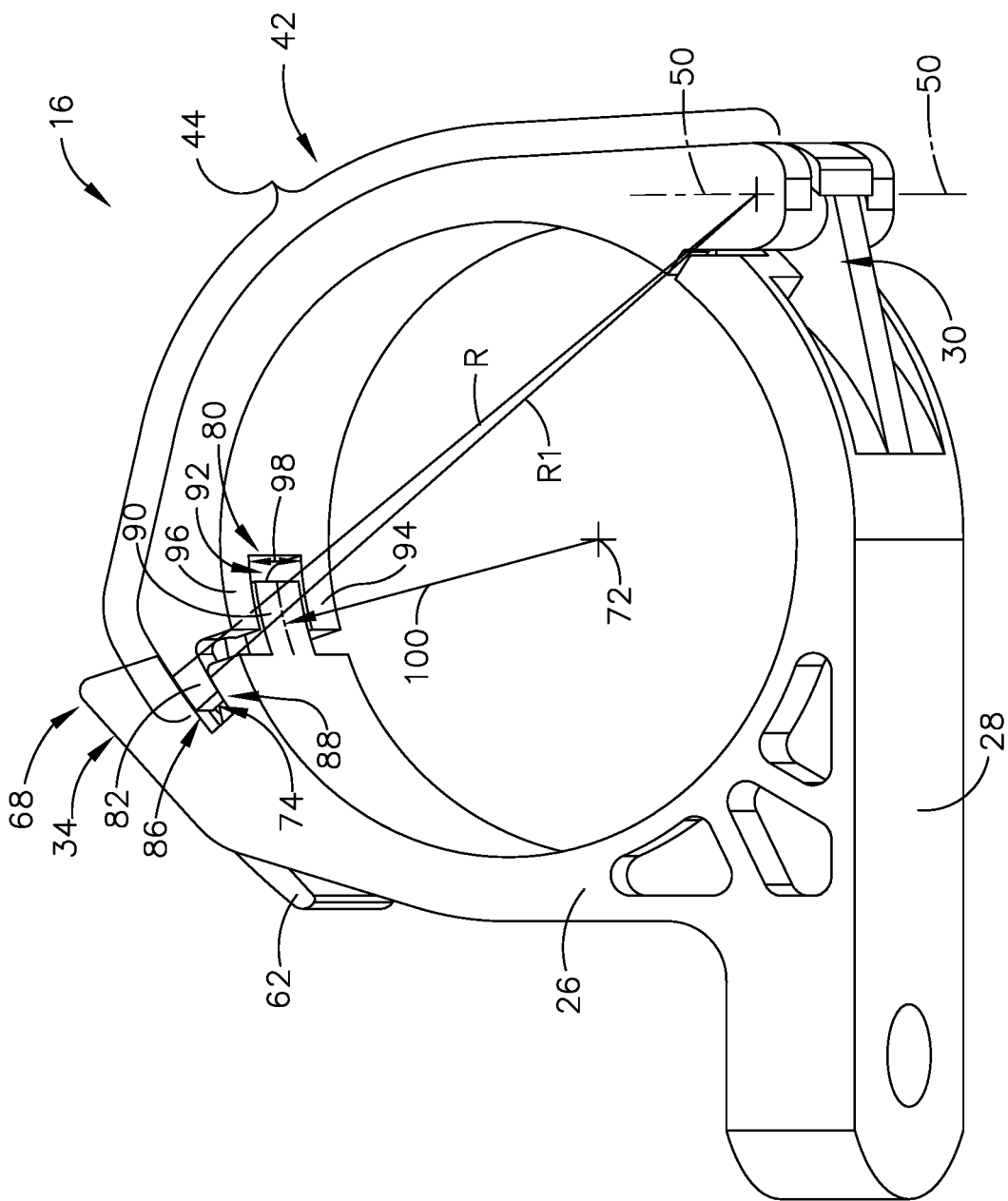
FIG. 10 is an enlarged bottom perspective view of the clamp assembly of FIG. 6 with a radial and lateral reinforcement arrangements engaged with the clamp assembly in a closed locked position.

In referring to FIGS. 4 and 10, clamp assembly 16 includes first end portion 30 and second end portion 34 of body 26 defines slot 74 and in this example, second slot 76. Second slot 76 is positioned spaced apart from slot 74, as seen in FIG. 4. Strap 42 includes first end 78 of a first end portion 44 which is pivotally coupled to first end portion 30 of body 26 to form hinge 48 with axis of rotation 50 about which second end 80 of first end portion 44 of strap 42 and second end portion 34 of body 26 can be moved relative to one another about axis of rotation 50 between an open position as seen in FIG. 5 and closed locked position 68, as seen in FIG. 6.

Second end 80 of first end portion 44 of strap 42 defines projection 82 and in this example, second end 80 defines second projection 84 spaced apart from projection 82. In closed locked position 68 as seen in FIG. 10, first end portion 44 of strap 42 and the body 26 define central axis 72 which extends between first end portion 44 of strap 42 and body 26 and projection 82 is positioned within slot 74 and similarly (not shown) second projection 84 is positioned within second slot 76.

Second slot 76 is similarly configured and constructed as slot 74. Slot 74 is defined by first wall portion 86 of second end portion 34 of body 26 as seen in FIG. 10 and is positioned at a first radial distance R from the axis of rotation 50 and is defined by second wall portion 88 of second end portion 34 of body 26 positioned at second radial distance R1 from the axis of rotation 50. First radial distance R is greater than second radial distance R1 providing radial restraint of projection 82 between first wall portion 86 and second wall portion 88. With second slot 76 having a similar construction as slot 74, second slot 76 also provides radial restraint of second projection 84. Slot 74 and second slot 76 provide confinement for projection 82 and second projection 84, respectively, thereby providing radial reinforcement for strap 42 and facilitating maintaining a circular opening 73, as seen in FIG. 6, configuration for this example of clamp assembly 16. The radial reinforcement resists radial force applied to first end portion 44 of strap 42 with capturing a larger dimensioned wire bundle 20 which applies a force against first end portion 44 with wire bundle captured in clamp assembly 16 with clamp assembly positioned in closed locked position 68. The radial reinforcement resists the force applied by a larger sized wire bundle 20 and facilitates maintaining the circular shape 73, in this example, and conforming wiring installation to requirements or regulations which call for sustaining the shape of clamp assembly 16 in closed locked position 68.

Clamp assembly 16 includes, as mentioned earlier, body 26 which includes first end portion 30, as seen in FIG. 4, and second end portion 34 of body 26 defines tab 90. Strap 42 includes first end 78 of first end portion 44 which is pivotally coupled to first end portion 30 of body 26 to form hinge 48 with axis of rotation 50 about which second end 80 of first end portion 44 of strap 42 and second end portion 34 of body 26 can be moved relative to one another about axis of rotation 50 between an open position, as seen in FIG. 5, and closed locked position 68, as seen in FIG. 6.

As seen in FIG. 10, second end 80 of first end portion 44 of strap 42 defines slot 92 defined by first wall portion 94 of second end 80 of first end portion 44 of strap 42 and second wall portion 96 of second end 80 of first end portion 44 of strap 42 spaced apart from one another. In closed locked position 68, first end portion 44 of strap 42 and body 26 define central axis 72 which extends between first end portion 44 of strap 42 and tab 90 is positioned within slot 92. First wall portion 94 and second wall portion 96 are spaced apart from one another in direction 98 transverse to radial direction 100 extending from central axis 72. With tab 90 positioned between first wall portion 94 and second wall portion 96, first end portion 44 of strap 42 is provided lateral reinforcement in resisting any forces applied to clamp assembly 16 in a direction along which wire bundle 20 extends through clamp assembly 16. This lateral reinforcement facilitates maintaining, in this example, circular opening 73 configuration, as seen in FIG. 6, and facilitates conforming to wiring requirements or regulations for sustaining clamp assembly 16 shape such as in this example circular opening 73 shape.

While various embodiments have been described above, this disclosure is not intended to be limited thereto. Variations can be made to the disclosed embodiments that are still within the scope of the appended claims.

What is claimed:

1. A clamp assembly for securing wire bundles to a structure, comprising:
   a body comprises:
      a first end portion; and
      a second end portion having a ramp assembly having a surface and a latch wall portion; and
   a strap comprises:
      a first end portion of the strap wherein a first end of the first end portion of the strap is pivotally coupled to the first end portion of the body to form a hinge with an axis of rotation about which the body and the strap rotate relative to one another;
      a second end portion of the strap having a locking wall portion, wherein:
         a radial distance from the surface to the axis of rotation decreases as the surface extends in a direction away from the second end portion of the strap, such that with the second end portion of the strap in contact with the surface and slid along in contact with the surface, the second end portion of the strap resiliently bends in a direction toward the first end portion of the strap; and
         with the second end portion of the strap moved beyond the surface, the second end portion of the strap resiliently bends in a direction away from the first end portion placing the locking wall portion of the second end portion in abutting relationship with the latch wall portion of the second end portion of the body and positioning the strap and the body in a closed locked position; wherein the clamp assembly includes at least one of:
         a second end portion of the body defines a slot, spaced apart from the surface, and a second end of the first end portion of the strap defines a projection, such that the projection is positioned within the slot with the strap and body in the closed locked position; and
         the second end portion of the body defines a tab and the second end of the first portion of the strap define a slot, such that the tab is positioned within the slot with the strap and the body in the closed locked position.

2. The clamp assembly of claim 1, wherein:
   the second end portion of the strap further includes a leg member and a head with the leg member connecting the head to the first end portion of the strap; and
   the leg member has a width dimension less than a width dimension of the first end portion of the strap and less than a width dimension of the head.

3. The clamp assembly of claim 1, wherein, with the strap and the body in the closed locked position, the strap and the body define a central axis which extends between the strap and the body.

4. The clamp assembly of claim 1, wherein the slot is defined by a first wall portion of the second end portion of the body positioned at a first radial distance from the axis of rotation and a second wall portion of the second end portion of the body positioned at a second radial distance from the axis of rotation with the first radial distance greater than the second radial distance.

5. The clamp assembly of claim 1, wherein the slot of the second end of the first end portion of the strap comprises a first wall portion of the second end of the first end portion of the strap and a second wall portion of the second end of the first end portion of the strap, spaced apart from one another, in a direction transverse to a radial direction extending from a central axis, which extends between the strap and the body and with the strap and the body such that the tab is positioned.

6. A clamp assembly for securing wire bundles to a structure, comprising:
   a body comprises:
      a first end portion; and
      a second end portion of the body defines a slot separated from a ramp assembly having a surface and a latch wall portion; and
   a strap comprises:
      a first end of a first end portion of the strap which is pivotally coupled to the first end portion of the body to form a hinge with an axis of rotation about which a second end of the first end portion of the strap and the second end portion of the body can be moved relative to one another between an open position and a closed locked position, wherein:
         the second end portion of the strap has a locking wall portion for engaging the latch wall portion for placing the clamping assembly in the closed locked position;
         the second end of the first end portion of the strap defines a projection; and
         in the closed locked position the strap and the body define a central axis and the projection is positioned within the slot, wherein:
            the slot is defined by a first wall portion of the second end portion of the body and is positioned at a first radial distance from the axis of rotation and is defined by a second wall portion of the second end portion of the body positioned at a second radial distance from the axis of rotation; and
            the first radial distance is greater than the second radial distance.

7. The clamp assembly of claim 6, wherein:
   the second end portion of the strap further comprises a leg member which connects a head to the first end portion of the strap and
   the head carries the locking wall portion.

8. The clamp assembly of claim 7, wherein a radial distance from the surface to the axis of rotation decreases as the surface extends in a direction away from the second end portion of the strap such that, with the head of the second end portion of the strap in contact the surface and is slid along in contact with the surface, the second end portion of the strap resiliently bends in a direction toward the first end portion.

9. The clamp assembly of claim 8, wherein with the second end portion moved beyond the surface, second end portion of the strap resiliently bends in a direction away from the first end portion placing the locking wall portion of the head of the second end portion of the strap in abutting relationship with the latch wall portion of the second end portion of the body, placing the strap and the body in the closed locked position.

10. The clamp assembly of claim 6, further includes a slot defined by a first wall portion of the second end of the first end portion of the strap and a second wall portion of the second end of the first end portion of the strap spaced apart from one another and the second end portion of the body defines a tab.

11. The clamp assembly of claim 10, wherein the first wall portion and the second wall portion are spaced apart from one another in a direction transverse to a radial direction extending from the central axis, such that with the strap and body in the closed locked position, the tab is positioned within the slot.

12. A clamp assembly for securing wire bundles to a structure, comprising:
a body comprises:
a first end portion; and
a second end portion of the body defines a tab and defines a slot separated from the tab; and
a strap comprises:
a first end of a first end portion wherein the first end portion of the body is pivotally coupled to the first end of the first end portion of the strap to form a hinge with an axis of rotation about which a second end portion of the strap and the second end portion of the body can be moved relative to one another between an open position and a closed locked position;
a second end of the first end portion of the strap defines a slot defined by a first wall portion of the second end of the first end portion of the strap and a second wall portion of the second end of the first end portion of the strap spaced apart from one another;
in the closed locked position the first end portion of the strap and the body define a central axis which extends between the first end portion of the strap and the body with the tab positioned within the slot; and
the first wall portion and the second wall portion are spaced apart from one another in a direction transverse to a radial direction extending from the central axis.

13. The clamp assembly of claim 12, wherein:
the second end portion includes a leg member which connects a head to the first end portion of the strap;
the second end portion of the body further includes a ramp assembly having a surface and a latch wall portion; and
the head of the second end portion of the strap has a locking wall portion.

14. The clamp assembly of claim 13, wherein a radial distance from the surface to the axis of rotation decreases as the surface extends in a direction away from the second end portion of the strap such that with the head of the second end portion of the strap in contact with the surface and is slid along in contact with the surface, the head and the leg member of the second end portion of the strap resiliently bend in a direction toward the first end portion.

15. The clamp assembly of claim 14, wherein with the head of the second end portion of the strap moved beyond the surface, the head and the leg member of the second end portion of the strap resiliently bend in a direction away from the first end portion positioning the locking wall portion of the head of the second end portion of the strap in abutting relationship with the latch wall portion of the second end portion of the body, placing the strap and the body in the closed locked position.

16. The clamp assembly of claim 12, wherein the second end of the first end portion of the strap further defines a projection positioned within the slot of the second end portion of the body in the closed locked position, wherein:
the slot of the second end portion of the body is defined by a first wall portion of the second end portion of the body positioned at a first radial distance from the axis of rotation; and
the slot of the second end portion of the body is defined by a second wall portion of the second end portion of the body positioned at a second radial distance from the axis of rotation with the first radial distance greater than the second radial distance.

17. The clamp assembly of claim 2, wherein the locking wall portion is defined by the head and extends in a direction away from the leg member.

18. The clamp assembly of claim 17, wherein the locking wall portion is positioned on opposing sides of the leg member.

19. The clamp assembly of claim 7, wherein the locking wall portion is positioned on opposing sides of the leg member and extends in a direction away from leg member.

20. The claim assembly of claim 13, wherein the locking wall portion is positioned on opposing sides of the leg member and extends in a direction away from the leg member.

* * * * *